(No Model.)
W. P. TEED.
NUT LOCK.
No. 338,448. Patented Mar. 23, 1886.
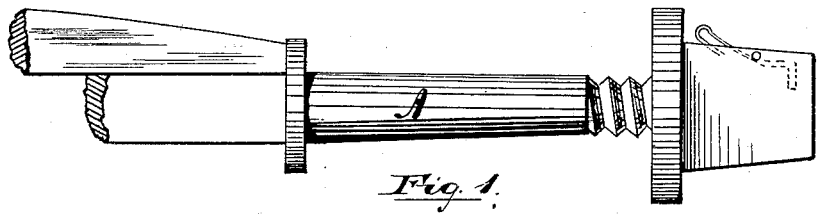
Fig. 1.
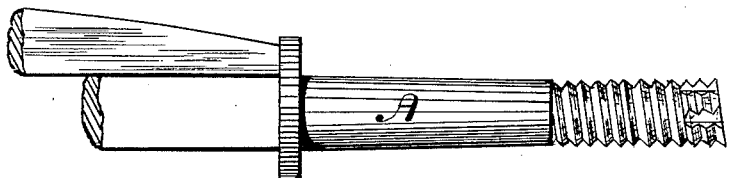 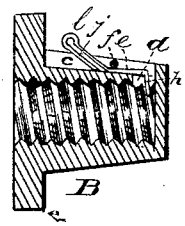
Fig. 2.
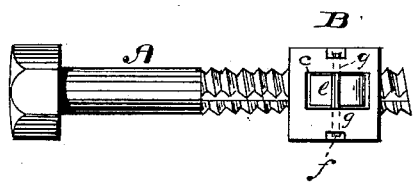
Fig. 3.
 
Fig. 5. Fig. 4.
Attest: Inventor
B. L. McNutty William P. Teed,
Fredk. P. Campbell By Drake & Co.,
Attys.

UNITED STATES PATENT OFFICE.

WILLIAM P. TEED, OF LIVINGSTON, ASSIGNOR OF ONE-HALF TO CHARLES I. HEDDEN, OF NEWARK, NEW JERSEY.

NUT-LOCK.

SPECIFICATION forming part of Letters Patent No. 338,448, dated March 23, 1886.

Application filed May 9, 1885. Serial No. 164,984. (No model.)

*To all whom it may concern:*

Be it known that I, WILLIAM P. TEED, a citizen of the United States, residing at Livingston, in the county of Essex and State of New Jersey, have invented certain new and useful Improvements in Nut-Locks; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to more effectually prevent the loosening or unscrewing of a nut from its bolt or shaft, and more particularly to prevent an axle-nut from working from the axle of a vehicle when backing the latter.

The invention consists in the arrangements and combinations of parts, substantially as will be hereinafter set forth, and finally be embodied in the clauses of the claim.

Referring to the accompanying drawings, in which like letters indicate corresponding parts in each of the several figures, Figure 1 is a side elevation of an axle and nut; Fig. 2, another view, the nut being detached and in section. Fig. 3 is a side elevation of a bolt and nut having my improvements. Fig. 4 is an end view of the bolt or axle, showing ratchet-teeth; and Fig. 5 is an end view of a spring-catch to engage said teeth.

In said drawings, A indicates a shaft, bolt, or axle, which is threaded to receive a nut, and notched or provided with ratchet-teeth to engage a spring-pawl on the nut, whereby the said nut is prevented from turning.

B is the said nut, which is inwardly threaded to be screwed upon said shaft or bolt. This is recessed, as at *c*, on the outside, to allow a spring-catch to lie therein, and perforated, as at *d*, to allow an end of said catch to pass into engagement with the ratchet-teeth of the shaft. Said catch *e* is preferably in the form of a spring-actuated lever or pawl, which is fulcrumed in said recess on the pin *f*, secured between ears *g g*, the said pin passing over said lever and holding the same in position. One end of the lever is bent to pass through the opening or perforation *d*, and is thereat provided with a catching-tooth, *h*, to engage the notched or ratcheted bolt or shaft to prevent the nut from unscrewing. Said tooth is provided with an incline, *i*, on one side, which enables the tooth to ride over the notches when the nut is screwed up. The end of the lever or pawl is also provided with a projecting bearing, *k*, which engages the side or inner wall of the perforation, and thus prevents the lever from turning or twisting when pressure on the holding-tooth is brought to bear. The opposite end, *l*, of the lever is provided with a spring, or is actuated by a spring, *j*, which tends to raise said end and depress the opposite toothed end. The spring is preferably a continuation of and integral with the lever, being turned under said lever, as shown. The said end *l* projects outwardly, as indicated in Fig. 1, and when arranged on an axle extends at an incline back from the extremity of the axle, as shown, so that when the wrench for unscrewing the nut is placed on said nut it will depress said end, and thus unlock the nut.

Having thus described the invention, what I claim as new is—

1. The combination of the notched axle or bolt and a recessed nut having a spring-actuated lever to engage the notch in the axle, held in said recess by a fulcrum, *f*, as set forth.

2. The combination of the notched bolt or axle, a nut, and a lever fulcrumed on said nut and having a tooth to engage the notch of said bolt, and a bearing, *k*, to prevent said lever from turning, substantially as set forth.

3. In combination, the notched or ratcheted and threaded bolt, the nut having the recess *c*, perforation *d*, and ears *g*, the lever having the tooth *h*, bearing *k*, and spring *j*, all formed of one piece, and the fulcrumal pin, said parts being arranged and operating substantially as set forth.

4. A lock-nut for vehicle-axles, having a lever fulcrumed thereon, said lever having at one end a tooth to engage a notch in said axle and at the other an outwardly or radially projecting and inclined end or arm adapted to be depressed by the wrench and to raise said tooth, substantially as set forth.

5. In a nut-lock, the nut having the recess *c*, opening *d*, and ears *g*, a lever, *e*, having one end turned, as at *j*, to form a spring and the other bent into said opening and toothed to engage the notch of the bolt, and provided with the incline $i$ and bearing $j$, and the pin $f$, all said parts being arranged and combined substantially as and for the purposes set forth.

6. The improved lock for vehicle-axles, combining therein a nut and a spring having a tooth to engage a notch in the axle, and having an end or arm, $l$, extending radially or outwardly from the nut and adapted to be depressed by the wrench and to raise the tooth from engagement from the axle, substantially as herein set forth.

In testimony that I claim the foregoing I have hereunto set my hand this 22d day of April, 1885.

WM. P. TEED.

Witnesses:
OSCAR A. MICHEL,
OLIVER DRAKE.